(12) United States Patent
Förster et al.

(10) Patent No.: US 7,124,057 B2
(45) Date of Patent: Oct. 17, 2006

(54) METHOD AND APPARATUS FOR DIAGNOSING A CYCLIC SYSTEM

(75) Inventors: Karl-Heinz Förster, Dresden (DE); Josef Binder, Hungtinton, NY (US)

(73) Assignee: Festo Corporation, Hauppauge, NY (US)

( * ) Notice: Subject to any disclaimer, the term of this patent is extended or adjusted under 35 U.S.C. 154(b) by 205 days.

(21) Appl. No.: 10/644,341

(22) Filed: Aug. 19, 2003

(65) Prior Publication Data

US 2005/0043923 A1 Feb. 24, 2005

(51) Int. Cl.
*G06F 7/04* (2006.01)

(52) U.S. Cl. ............ 702/183; 702/182; 702/186; 702/188

(58) Field of Classification Search .......... 702/45, 702/50, 182, 100; 73/861.02, 861.03, 861.42, 73/861.43, 1.16; 364/470.13; 700/283
See application file for complete search history.

(56) References Cited

U.S. PATENT DOCUMENTS

| | | | |
|---|---|---|---|
| 2,826,068 A * | 3/1958 | Sperry ............ 73/861.02 |
| 4,112,879 A * | 9/1978 | Assenheimer et al. ...... 123/478 |
| 4,545,257 A * | 10/1985 | Tomita ............ 73/861.17 |
| 4,734,869 A | 3/1988 | Mickowski |
| 4,856,278 A | 8/1989 | Widmann et al. |
| 4,862,385 A | 8/1989 | Fujita et al. |
| 4,976,144 A | 12/1990 | Fitzgerald |
| 4,985,857 A | 1/1991 | Bajpai et al. |
| 5,004,264 A * | 4/1991 | Kozaki et al. ............ 280/5.51 |
| 5,067,099 A | 11/1991 | McCown et al. |
| 5,081,599 A | 1/1992 | Saito |
| 5,218,968 A | 6/1993 | Apple |
| RE34,559 E | 3/1994 | Mickowski |
| 5,329,465 A | 7/1994 | Arcella et al. |
| 5,343,737 A | 9/1994 | Baumoel |
| 5,453,944 A | 9/1995 | Baumoel |
| 5,471,400 A | 11/1995 | Smalley et al. |
| 5,493,512 A * | 2/1996 | Peube et al. ............ 702/47 |
| 5,550,498 A | 8/1996 | Kwan et al. |
| 5,594,663 A | 1/1997 | Messaros et al. |
| 5,608,845 A | 3/1997 | Ohtsuka et al. |
| 5,628,229 A | 5/1997 | Krone et al. |
| 5,642,278 A | 6/1997 | Wang et al. |
| 5,801,964 A | 9/1998 | McCarthy |
| 5,805,452 A * | 9/1998 | Anthony et al. ........ 700/142 |
| 5,893,047 A | 4/1999 | Gimblett et al. |

(Continued)

FOREIGN PATENT DOCUMENTS

DE 19628221 A1 4/1998

(Continued)

*Primary Examiner*—Marc S. Hoff
*Assistant Examiner*—Felix Suarez
(74) *Attorney, Agent, or Firm*—Hoffmann & Baron, LLP

(57) ABSTRACT

A method and apparatus for determining the service life of a cyclic system the method including the steps of determining at least one characteristic of the system to determine a characteristic value and determining a cycle time of the system. The at least characteristic value is applied to an algorithm in which the characterisitic value is integrated to determine a diagnostic value, and comparing the diagnostic value to a predetermined value to determine the performance status of the system. The apparatus including a sensor for determining a system characteristic and a calculating unit operatively connected to the sensor. The calculating unit including circuitry for performing a mathematical integration on the system characteristic to determine a diagnostic value and comparing the diagnostic valve to a predetermined value to determine the performance status of the system. A notification device operatively connected to the calculating unit for indicating the operational status of the system.

28 Claims, 3 Drawing Sheets

U.S. PATENT DOCUMENTS

| | | | |
|---|---|---|---|
| 6,131,609 A * | 10/2000 | Metso et al. | 137/552 |
| 6,246,972 B1 | 6/2001 | Klimasauskas | |
| 6,282,463 B1 | 8/2001 | Oneyama et al. | |
| 6,292,757 B1 | 9/2001 | Flanagan et al. | |
| 6,308,138 B1 | 10/2001 | Jones et al. | |
| 6,405,108 B1 | 6/2002 | Patel et al. | |
| 6,425,247 B1 | 7/2002 | Schmid | |
| 6,542,853 B1 | 4/2003 | Murakami et al. | |
| 6,678,584 B1 * | 1/2004 | Junk et al. | 700/282 |
| 6,711,507 B1 | 3/2004 | Koshinaka et al. | |
| 6,874,480 B1 * | 4/2005 | Ismailov | 123/494 |
| 2002/0060175 A1 * | 5/2002 | Conrad et al. | 210/85 |
| 2003/0061004 A1 * | 3/2003 | Discenzo | 702/182 |
| 2003/0125841 A1 | 7/2003 | Schlosser | |
| 2003/0208305 A1 * | 11/2003 | Junk et al. | 700/282 |
| 2005/0224078 A1 * | 10/2005 | Zdrojkowski et al. | 128/204.23 |

FOREIGN PATENT DOCUMENTS

| | | |
|---|---|---|
| DE | 100 52 664 A1 | 5/2002 |
| DE | 10052664 | 5/2002 |
| EP | 0534 506 A2 | 3/1993 |
| EP | 0 587 902 A1 | 3/1994 |
| EP | 0740805 A1 | 7/1995 |
| EP | 0 850 363 B1 | 7/1998 |

* cited by examiner

METHOD AND APPARATUS FOR DIAGNOSING A CYCLIC SYSTEM

FIELD OF INVENTION

The present invention relates to a method and apparatus for diagnosing a cyclic system and more specifically for diagnosing the operational status of a fluid power system.

BACKGROUND OF THE INVENTION

In the manufacturing environment, various systems are employed in order to operate machinery and transport goods. In order to achieve consistent output and continuity in the various systems, frequent maintenance and trouble shooting is often required. One manor of maintaining machinery is to wait until a failure has occurred in a particular component and then replace that component on an as-needed basis. Such maintenance, however, often requires untimely interruptions of the production process leading to costly down time.

Accordingly, there has been a growing trend in machinery maintenance to employ preventative maintenance procedures so that a machine is not brought down by an untimely failure. Instead, maintenance may be performed during planned down times with various components being serviced in an efficient process. However, since preventative maintenance often requires replacement of components before they actually fail, it must be determined which part is in need of replacement or repair and when. One way to determine the replacement scheduling of components would be to assign a particular cycle life to a component and simply replace that component after it has achieved its predetermined cycle life. However, how long a component will remain operationally effective depends on a variety of factors. For example, in a pneumatic system, the level of contamination in the pressurized air, the lubrication used, the operating pressure, ambient environment, and cycle speeds are just a few of the factors, which will influence cycle life. Accordingly, this method of preventative maintenance can lead to the replacement of parts, which are in fine working order creating a wasteful and relatively expensive procedure.

There have been attempts to use more sophisticated means of predicting when a component will fail in a particular system. One such method of predetermining component failure is set forth in EP 0740805 A1. The system set forth in the patent publication includes the use of a transducer, a learning mode, data collection at predetermined multiple points within a cycle, and memory operable during a learning mode. During a cycle digital sample signals may be taken at 100 to 1000 points of the cycle. It also includes a means for providing permissible ranges of values at the predetermined points in comparison between actual data and data of a learning mode and means to provide an output signal if the actual data exceeds the permissible data on predetermined points. This method, however, requires significant memory space in order to store the many data points in the cycle. In addition, high computational speed is needed for comparing the data at each point in the cycle with the predetermined range of data values. Complex mathematical statistical evaluation is also required.

U.S. Pat. No. 5,329,465 is directed to an on-line valve diagnostic monitoring system. The system senses operational characteristics of a valve and provides a diagnosis of the aberrations in the system characteristics. Multiple sensors are used which then signal to a data acquisition system which can be transmitted to remote locations. In a pneumatically controlled valve, a pressure sensor or flow meter may be used to detect the air pressure required to actuate the valve. A stem strength sensing means for directly sensing tension and compression of the valve stem is also required for sensing the position of the valve and travel the valve stem. Accordingly, various sensors are used and a significant amount of data is collected.

In addition, the use of individual system characteristics has heretofore proven to be unacceptable for providing a reliable picture of system performance for determining periodic maintenance schedules. For example, in a pneumatic system, pressure measurements in the supply and exhaust lines of a valve or a cylinder only deliver information about the cylinder functions which are in most cases independent of valve functions. While pressure measurements may provide diagnostic information with regard to cylinder function, it does not provide sufficient diagnostic data for valve functions.

Flow measurements in a supply line in a pneumatic circuit delivers information about the functions of the entire pneumatic circuit. The information about cylinder functions would be limited for a time depending function, thus not permitting to differentiate between cylinder failures and other possible failures, e.g., malfunction of valve, clogged silencer, etc. The flow measurement improves the diagnosis for pneumatic circuit, but still does not provide sufficient diagnosis data for all functions.

Another measurement which can be taken is cycle time for a complete cycle of the circuit. The cycle time measurement delivers information about the functions of the entire pneumatic circuit, including information about cylinder and valve functions. However, this cycle time does not provide sufficient diagnostic data to determine whether a particular component is nearing failure.

Accordingly, it would be desirable to provide a method and apparatus for evaluating a cyclical system in order to determine when preventative maintenance should be performed. It is further desirable to provide such a method and apparatus which requires minimal collection of data and can be easily and inexpensively employed.

SUMMARY OF THE INVENTION

It is an advantage of the present invention to provide a method and apparatus for diagnosing a cyclic system.

It is another advantage of the present invention to provide a method for diagnosing the operational status of a fluid power system using one system characteristic.

In the efficient attainment of these and other advantages the present invention provides a method and apparatus for determining the service life of a cyclic system. The method includes the steps of determining at least one characteristic of the system to determine a characteristic value and determining a cycle time of the system. The at least one characteristic value is applied to an algorithm in which the characteristic value is integrated to determine a diagnostic value, and comparing the diagnostic value to a predetermined value to determine the operational status of the system.

The apparatus includes a sensor for determining a system characteristic and a calculating unit operatively connected to the sensor. The calculating unit includes circuitry for performing a mathematical integration on the system characteristic to determine a diagnostic value and compares the diagnostic valve to a predetermined value to determine the performance status of the system. A notification device is operatively connected to the calculating unit for indicating the operational status of the system.

In a preferred form of the invention, the characteristic value is flow rate Q and the algorithm to determine the status of the system is $$K = \int_0^T Q dt$$

wherein Q is the flow rate, T is the cycle time and K is the diagnostic value.

The present invention further provides a cyclic fluid power system having an operational status monitor including a valve in fluid communication with a fluid source. An actuator is operatively connected to the valve. A sensor is provided for determining a system characteristic. A calculating unit is operatively connected to the sensor. The calculating unit includes circuitry for performing a mathematical algorithm on the system characteristic to determine a diagnostic value and compares the diagnostic value to a predetermined value to determine the performance status of the system. A notification device is operatively connected to the calculating unit for indicating the operational status of the system.

For a better understanding of the present invention, reference is made to the following detailed description to be read in conjunction with the accompanying drawings and the scope will be defined in the appended claims.

DETAILED DESCRIPTION OF THE PREFERRED EMBODIMENTS

The present invention provides a method and apparatus for providing diagnostic information for determining the operational or performance status of a system for preventative maintenance purposes. The present invention permits the prediction of failures in a fluid power circuit including determination of possibly failing components and failure causes. A prediction of the life cycle of the system or its components under the conditions of a particular application may also be obtained. The present invention uses a minimum number of sensors in the system in order to provide the necessary information.

Figure 1:
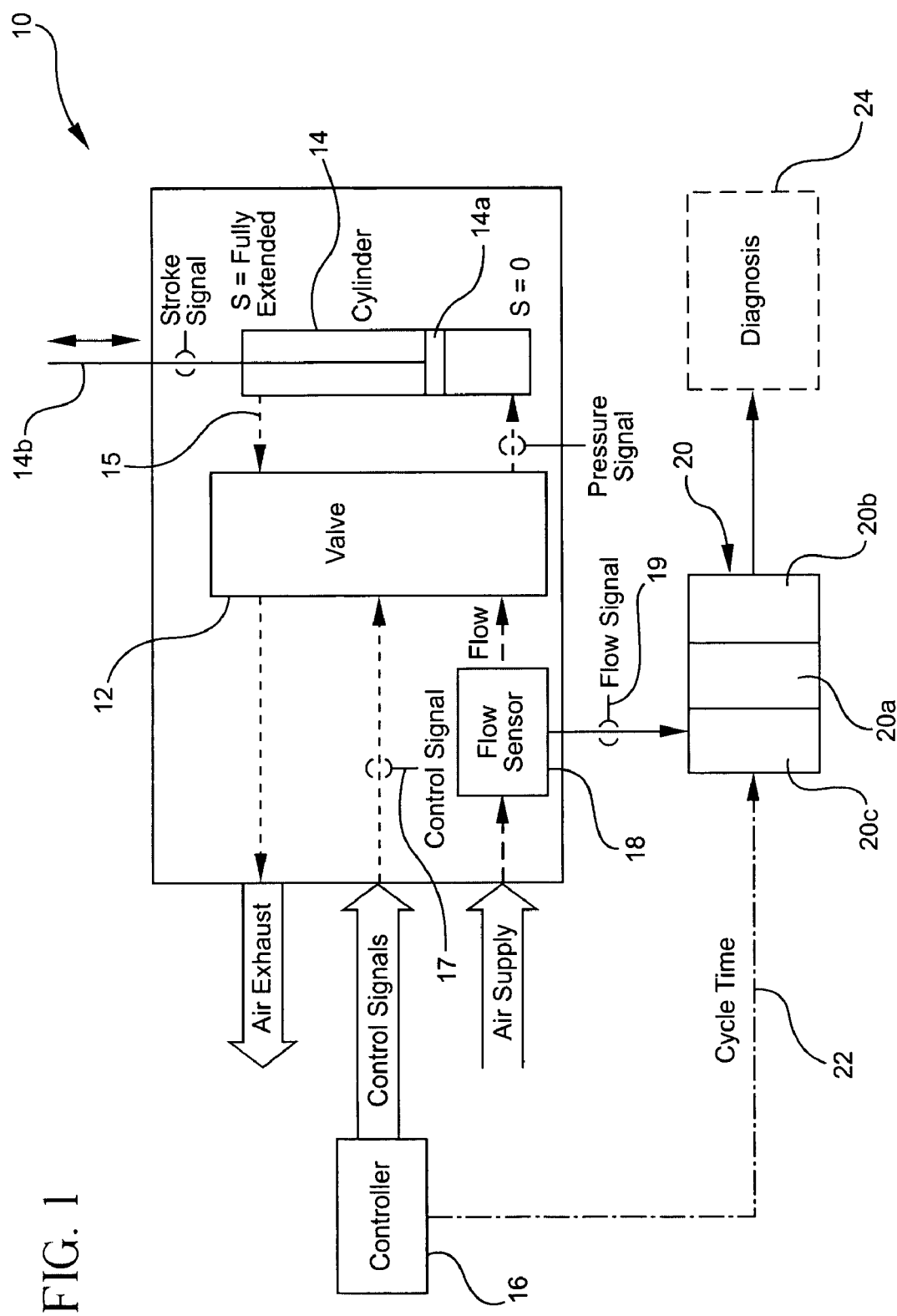
FIG. 1 is a schematic diagram of a cyclic system including the apparatus of the present invention.

Referring to FIG. 1, a fluid power system, such as pneumatic system 10, generally includes a valve 12, which is operatively connected to an actuator 14. Actuator 14 may include a drive component 14a such as a piston which is attached to a piston rod 14b. The valve 12 receives a signal from a controller 16, which causes the valve 12 to shift at the predetermined time when movement of the actuator 14 is desired. A system may include a plurality of valves and actuators with the controller coordinating the actuation of the various valves in order to achieve the desired actuator response. In a cyclic system, the system is designed to operate through a particular repeatable cycle. Accordingly, the actuation of the valve and corresponding actuator movement is repeated many times. The present invention utilizes variations in a system characteristic over time in order to determine the operational fitness of the system and its components.

The present invention preferably utilizes one characteristic of the system to predict failures. In the preferred embodiment, the system characteristic is the flow rate Q. Integrating the flow rate Q over the cycle time T provides a diagnostic value K, also referred to as the flow integral, which can be used to predict preventative maintenance requirements. Specifically, the diagnostic value K is calculated using the following algorithm:

$$K = \int_0^T Q dt$$

wherein Q=flow rate and T=cycle time.

The characteristic value of the system, i.e. flow rate, can be measured by a transducer or sensor of a type which is known in the art. By integrating the flow rate Q over a certain time period, the volume of fluid consumed for that period is determined. A change in the amount of fluid consumed is indicative of changes in the system's operational status. For example, a system that is leaking air will consume more air than when it was not leaking resulting in an increase in the K value. This change in the diagnostic value is used to indicate that maintenance is required.

The integration may be performed in calculating unit 20 shown schematically in FIG. 1. Calculating unit 20 may include a processor 20a that may be in the form of a microprocessor or in the form of discrete components such as op amps and resisters. If a digital microprocessor is employed, an analog to digital converter 20c may be used to convert an analog signal generated by the sensor to a digital signal, which can be processed by the microprocessor. Calculation unit 20 may also include a memory storage device 20b to temporarily store information used in the calculation process.

Figure 2:
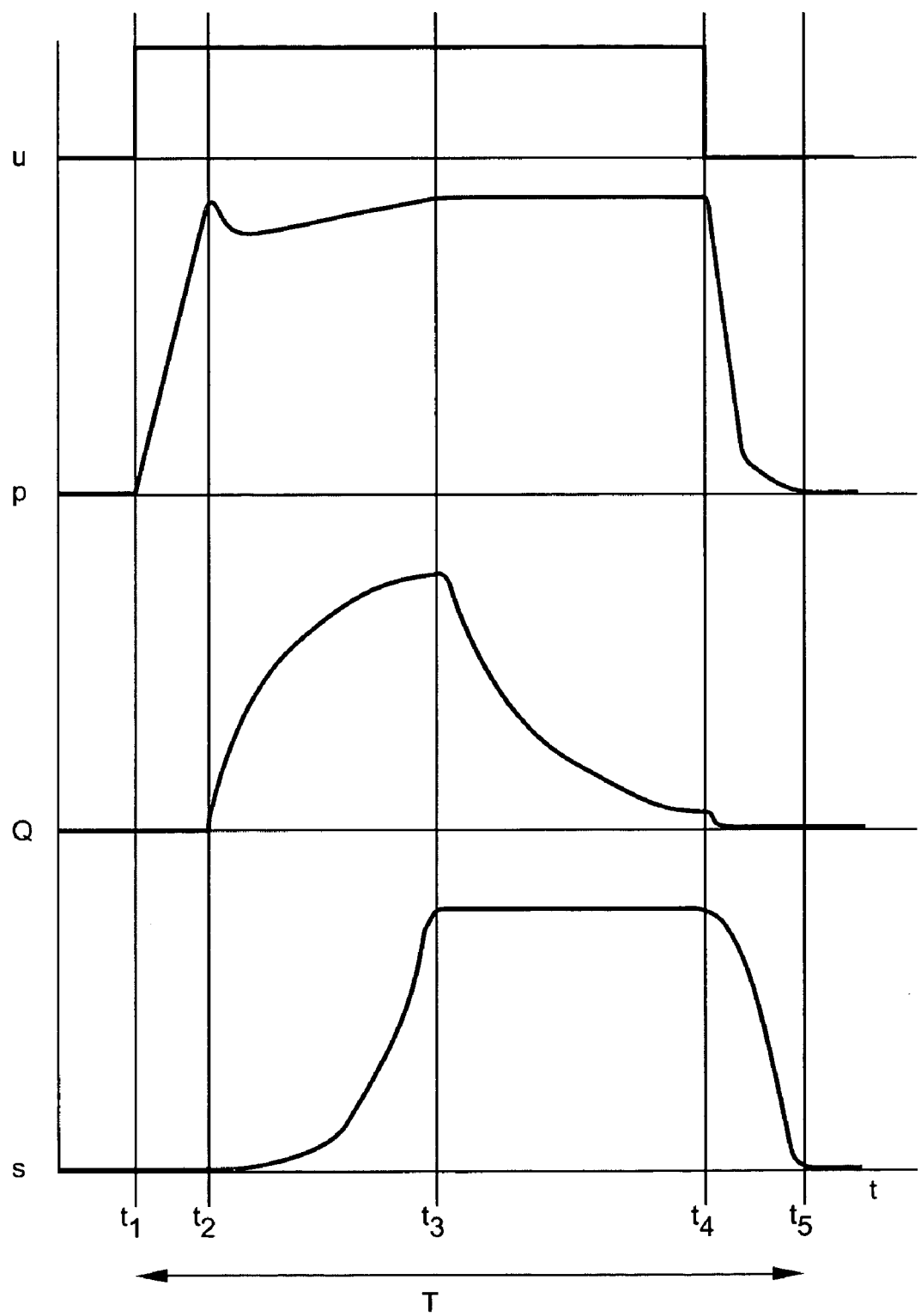
FIG. 2 is a graphical representation of system parameters valve actuation voltage u, pressure p, flow Q, and piston movement s verses time.

The integration of Q is preferably done over cycle time T. Cycle time T may be the time for one complete cycle of a cyclic system. For example, as shown in FIG. 2, in a cyclic pneumatic system including a valve and piston driven cylinder, the full cycle time, T, includes the time from valve actuation $t_1$ until the cylinder piston has returned to its initial position $t_5$. Cycle time T may be measured and calculated by a programmable logic controller, PLC, which may also be used to control the entire fluid power system. Cycle time T would be the time it takes to complete one cycle. Alternatively, the cycle time T may be calculated using limit switches on a fluid power actuator, such as a linear drive, with the limit switches indicating the two end positions of the cylinder and wherein movement of the piston from one end to the other and back again constitutes one cycle. In a preferred embodiment, cycle time T may equal the entire time for one complete cycle as shown in FIG. 2. One complete cycle being the time period defined by an actuation of the valve $t_1$ and a return of the piston to an initial position $t_5$. By integrating over the entire cycle time, any deviation from normal operating parameters may be diagnosed regardless of where the problem occurs in the cycle. Such deviations may include leakage, excess friction, etc.

It is also within the contemplation of the present invention that the period of integration may be chosen to include only part of a full cycle. For example, the integration may be done over the time of piston movement, s, which is period $t_2$ to $t_3$ shown in FIG. 2. In this case the algorithm would include an integration of Q over time $t_2$ to $t_3$.

$$K = \int_{t2}^{t3} Q\,dt$$

Alternatively, T may equal the time of valve actuation, u, shown in FIG. 2 as time period $t_1$ to $t_4$ $$K = \int_{t1}^{t4} Q\,dt.$$

By limiting the time period to a certain period, a particular component of the system, such as the cylinder, can be more specifically monitored. For example, integrating flow rate Q over the time period $t_2$ to $t_3$, provides the diagnostic value K, which in this case is the volume of fluid for the period of piston forward movement. If this value deviates beyond an acceptable parameter, them a problem with the cylinder, such as leakage, may be diagnosed. It is further within the contemplation of the present invention that monitoring of both the entire cycle and portions of the cycle can be performed in order to provide information about the status of the system.

In an alternative embodiment of the present invention, the cycle time use for integrating the flow can be derived from the flow Q itself. The flow rate Q generated by flow sensor 18 can be mathematically differentiated as follows:

L=dQ/dt

L, therefore, is the rate of change of the flow over time. In a system having an actuator such as a cylinder, this value can be used to determine the beginning and the end of cylinder movement. It is desirable to integrate the flow Q over this period in the cycle. The ability to determine when cylinder movement begins or ends is useful in determining the period over which to integrate the flow in order to determine the diagnostic value K. The behavior of a pneumatic system is graphically represented in FIG. 2. This graph depicts the response over time of the valve actuation, or signal, voltage u, pressure p, flow Q and cylinder piston position s.

At $t_1$ the valve actuation voltage, u, is switched on and the valve opens. A minor flow condition occurs as the tubing running to the cylinder is filled with air. The pressure p builds up in the system until the pneumatic force is larger than the frictional and external forces on the piston. At $t_2$, the cylinder piston starts to move (s>0). The pressure, p, changes only a small amount depending on the air supply and its ability to supply an adequate amount of air. The flow, Q, sharply rises as air fills the cylinder. The cylinder reaches its end position at $t_3$ and the flow again sharply changes, this time decreasing significantly between $t_3$ and $t_4$. For the time period $t_3$ to $t_4$, the cylinder remains at its end position (s=fully extended) and the full pressure, p, is applied to the cylinder piston. The flow Q decreases to zero depending on compressibility, leakage and other factors. After $t_4$, the solenoid voltage u is zero. The pressure p decreases to zero, and the piston may return to its original position (s=0) with the flow being negligible. At $t_5$, the piston has returned to its initial position.

As demonstrated by the graph of FIG. 2, the flow Q has well defined changes in its slope, or rate of change, at $t_2$ and $t_3$ which is the period of piston movement. When a fluid power cylinder piston begins to move, the flow rate changes rapidly as the fluid fills the ever-increasing volume created by the moving piston. This sharp change in flow rate, which occurs upon piston movement, can be detected by differentiating the flow that results in a rate of change value. Likewise, when the cylinder piston comes to an end position, the flow decreases sharply as the cylinder volume becomes fixed. The significant rate of change of the flow at $t_3$ can be easily calculated by differentiating the flow. The calculation device can be configured, such as through software, to look for a predetermined rate of change of the flow Q, dQ/dt, at or above a certain value. For example, a positive predetermined increase in the flow rate would indicate the time $t_2$ for integration purposes and a predetermined decrease in the flow rate would indicate the time $t_3$ for integration purposes in the algorithm $$K = \int_{t2}^{t3} Q\,dt.$$

In this case, T equals $t_3-t_2$. Accordingly, the start and stop time of a fluid power cylinder can be determined by differentiating the flow rate Q. While the piston movement could be determined using positioned sensors, the use of the value L eliminates the need, and associated expense and complexity, for extra components. In the present invention, the flow is already sensed to determine the diagnostic K value; therefore, no additional sensors are required. The calculation unit that is configured to integrate the flow can also be configured to process the differential of the flow L.

Figure 3:
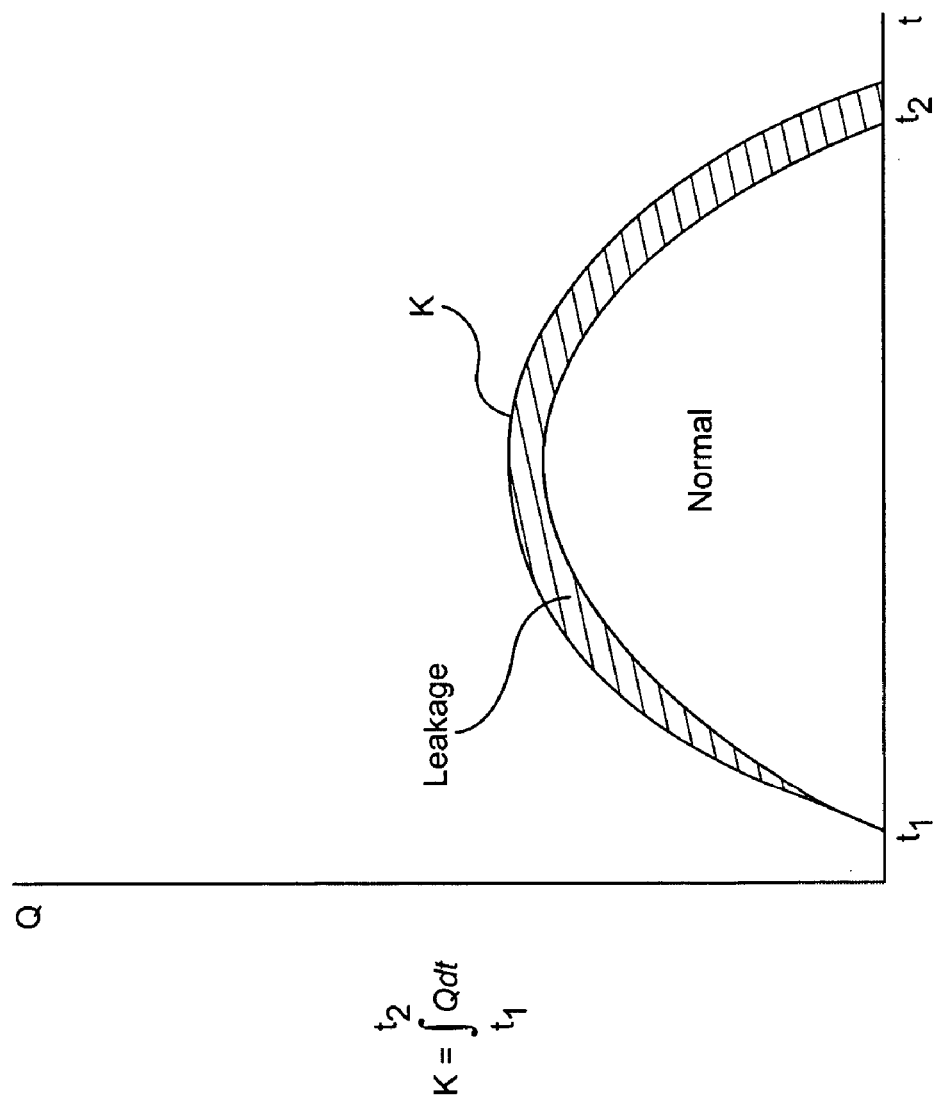
FIG. 3 is a graphical representation of flow rate Q verses time T showing a normal condition and a leak condition.

It has been found that the diagnostic value K, also referred to as the flow integral, varies with the operational condition of the system. Therefore, it can be used for diagnosis and enables an easy statistical analysis and/or pattern recognition with a failure diagnosis of the pneumatic system or circuit. The integration of system flow over the cycle time provides the volume of fluid employed in a given cycle. In a fluid power system, as the components wear and reach the end of their cycle life, seals begin to degrade. Such degradation allows air to flow past the seals causing a leaking condition. FIG. 3 illustrates graphically a leak condition in which case the volume of fluid increases over the normal volume of a non-leaking system. This increase in volume is reflected in the diagnostic value K that is an integral of the flow rate Q. In a pneumatic cylinder if the seals are worn to permit leakage, the flow to move that particular cylinder is increased. In addition, if bearings on a pneumatic cylinder begin to wear causing increased loading on the system, more pressure will be required to move the cylinder. In order to have this increased pressure, a greater volume of air is required. Therefore, the flow would also show an increase. Accordingly, a change in the volume of fluid per cycle indicates a system whose components are beginning to fail. It is the integration of the flow over cycle time which averages out peeks and valleys caused by temporary events thereby eliminating unwanted influences on measuring. Accordingly, changes in the diagnostic value K demonstrate a change in the operational condition of the system and are used to alert operators of the need to perform maintenance.

The calculated K values may be subjected to statistical analysis in order to develop a trend in changing K values. For example, the K values generated may be sampled over a predetermined number of cycles and averaged to determine a mean value, which is then compared to an acceptable range of deviation. In this example, the K value for every 100 cycles could be captured and averaged over 1000 cycles.

The average K value would then be evaluated to determine system condition. It is within the contemplation of the present invention that any of a number of statistical methods well known in the art could be employed to determine an average or mean K value, $K_{ave}$.

In order to determine the acceptable limit of K values for a particular system, a system having new components may be initially run to determine a particular diagnostic K value for that system. This could be done for each individual system. Alternatively, if several systems are being produced having the same design, then a diagnostic value could be determined for one such system and applied to the other similar systems. Depending on the system, an acceptable change in K value would be established. This could be set up as a range or a percentage change in the value. If the diagnostic value K changes a certain percentage or falls outside a particular range, a signal could be sent to an operator indicating that the circuit is in need of maintenance.

The present invention may be employed in a wide variety of cyclic systems. In the preferred embodiment, as shown in the schematic of FIG. 1, the present invention is employed in a fluid power system. The fluid power system 10 may include a variety of valves 12 operably connected to actuators 14 by fluid supply lines 15. One such valve and actuator is schematically represented in FIG. 1. The system 10 may be driven by a control device 16 such as a PLC or other control device as is well known in the art. The control device 16 may be operatively connected to the various valves and actuators that make up the system and generates a control signal 17, which actuates valve 12. The location of flow sensor 18 can be chosen based upon the particular component in the system that is to be monitored. In a pneumatic system including a valve and cylinder, if the sensor were positioned to sense the flow in the fluid supply line to the valve, then the condition of the valve and cylinder would be reflected in the K value. Alternatively, if the sensor were disposed in the system to sense the flow between the valve and cylinder, then the condition of the cylinder would be reflected in the K value. The present invention contemplates that one or more flow sensors could be located in various locations throughout the system to assist in determining the condition of the system and its components.

In operation, the apparatus of the present invention may include flow sensor 18 for monitoring the flow in the system and generating a flow signal 19. Flow sensor 18 may be of a type commercially available and well known in the art, such as an in-line paddle wheel device, which emits a voltage proportional to the sensed flow rate. Flow sensor 18 may be located in the air supply line 15 to valve 12. The flow signal 19 is fed to calculating unit 20. In the preferred embodiment, calculating unit 20 includes a digital microprocessor 20a, a memory storage device 20b, and an analog to digital (A to D) converter 20c. The flow signal 19 may be analog in nature and converted to digital form by A to D converter 20c. Calculating unit may also be operatively connected to controller 16. Controller 16 may provide calculating unit 20 with a cycle time signal 22. Calculation unit 20 alternatively could include an integration circuit consisting of op-amps and resisters as is well known in the art.

Based on information produced by flow signal 19 and cycle time signal 22, the calculation unit 20 integrates the flow rate value Q over cycle time 0 to T to generate the K value. The calculation of the K value may be performed at a predetermined number of cycles and averaged over another predetermined number of cycles. An average K value, $K_{ave}$, may then calculated by the calculating unit 20. The $K_{ave}$ value is then compared to stored information, which may include an acceptable range of values, to determine if the calculated $K_{ave}$ value is within a particular acceptable range. The result of the comparison may generate system diagnostic information which may displayed on notification device 24 which is operatively connected to the calculation unit. If the calculated $K_{ave}$ is within limits, then a normal operational status may be generated and displayed. The $K_{ave}$ value may also be displayed. If the calculated $K_{ave}$ value falls outside of the acceptable range, an alert may be generated on notification device 24 to alert a user that the system is in need of maintenance. The notification and displays may be in the form of a signal light or audible signal or a message on a visual display. This notification may be displayed on the machine and/or transmitted to a central location such as a plant operator's computer terminal.

In an alternative embodiment, calculation unit 20 may also differentiate the flow value Q to determine the beginning and end of a cycle as set forth above with respect to FIG. 2. In this embodiment, the need to have the cycle time signal 22 inputted into calculation unit 20 would be unnecessary.

Since only one characteristic of the system needs to be tracked, only a limited amount of data need be collected and stored in order to predict the remaining cycle life of the system.

In an alternative embodiment, a change in diagnostic value and a change in cycle times are calculated to provide information regarding the service life of a system. The diagnostic value is evaluated over a plurality of system cycles in order to determine a change in the diagnostic value. The time for completing the cycle time is also evaluated over the plurality of system cycles to determine a change in the cycle time. At predetermined times, the change in the diagnostic value may be compared to the change in the cycle time to determine the performance status of the system. In this embodiment, the diagnostic value K is the integral of the flow Q as described above. It has been found that as this value increases and the cycle time remains the same, leakage problems are occurring in the system. It has also been found that as the cycle diagnostic value K increases and the cycle time increases, there is likely an increase in mechanical load or friction in the cylinder.

In order to implement this process, the calculation unit 20 calculates and stores in memory device 20b K values and cycle times T, T being the time it takes to complete a cycle. At a predetermined number of cycles, the change in cycle times $\Delta T$ is calculated, as is the change in diagnostic value $\Delta K$. The $\Delta T$ and $\Delta K$ are then compared with the results of this comparison and may be outputted to a display or other signal device in order to alert a user of the particular problem, i.e., leakage or increased mechanical load. For example, the diagnostic value $K_1$, is calculated at a first time period $T_1$. This diagnostic value at $T_1$ is compared to the diagnostic value $K_2$ calculated at a second time period $T_2$ to determine the diagnostic value delta $\Delta K$, which is $K_2-K_1$. The cycle time at a first time period $T_1$ is compared to the cycle time at a second time period $T_2$ to obtain a cycle time delta $\Delta T$, which is $T_2-T_1$. The diagnostic value delta $\Delta K$ is then compared to the cycle time delta $\Delta T$ to obtain an operational status of the system. This method relies only on a flow sensor and a time signal generated by a controller, so there is no need for additional sensors or components.

While there have been described what is presently believed to be the preferred embodiments to the invention, those skilled in the art will realize that various changes and modifications may be made to the invention without departing from the scope of the invention, and it is intended to claim all such changes and modifications as fall within the true scope of the invention.

What is claimed is:

1. A method of determining the service life of a fluid power cyclic system comprising the steps of:
    determining at least one characteristic of the cyclic system to determine a characteristic value, wherein the characteristic value is a flow rate of the system;
    determining a cycle time of the cyclic system;
    applying the flow rate to an algorithm in which the characteristic value is integrated over the cycle time to determine a diagnostic value; and
    comparing the diagnostic value to a predetermined value to determine the service life status of the cyclic system.

2. The method as defined in claim 1, wherein the algorithm to determine the status of the system is $$K = \int_0^T Qdt$$

wherein Q is a flow rate, T is the cycle time and K is the diagnostic value.

3. The method as defined in claim 1, further including the step of providing a flow sensor for determining the flow value.

4. The method as defined in claim 1, further including the step of providing a PLC for determining the cycle time T.

5. The method as defined in claim 1, further including the step of displaying diagnostic information to a user.

6. The method as defined in claim 2, further comprising the step of differentiating the flow rate Q with respect to time, dQ/dt, to determine a start and stop time of a movement of an actuator.

7. The method as defined in claim 2, further comprising the step of determining a time period for integration by differentiating the flow.

8. The method as defined in claim 2, wherein the flow rate is integrated over a time period defined by a start and stop time of a movement of an actuator.

9. The method as defined in claim 2, wherein the system includes a fluid power valve operatively connected to a piston driven cylinder and further comprising the step of integrating the flow rate Q over the time period defined by an actuation of the valve and a return of the piston to an initial position.

10. The method as defined in claim 2, further comprising the step of determining the time period T from a movement of a device in the system and integrating the flow over the time period T.

11. The method as defined in claim 2, further comprising the step of integrating the flow rate Q over the time period T, wherein T equals the time for one complete cycle of the system.

12. A method of determining the service life of a cyclic fluid power system comprising the steps of:
    determining a flow rate of the cyclic fluid power system;
    determining a cycle time of the cyclic system;
    integrating the flow rate over the cycle time to determine a diagnostic value; and
    comparing the diagnostic value to a predetermined value to determine an operational status of the system relating to the service life of the cyclic fluid power system.

13. The method as defined in claim 12 further comprising the steps of storing the diagnostic value calculated at a first time period $T_1$ and comparing the diagnostic value at $T_1$ to the diagnostic value calculated at a second time period $T_2$ to determine a diagnostic value delta, $\Delta K$.

14. The method as defined in claim 13 further comprising the step of calculating a change in cycle time between $T_1$ and $T_2$ to obtain a cycle time delta, $\Delta T$.

15. The method as defined in claim 14 further comprising the step of comparing the diagnostic value delta $\Delta K$ to the cycle time delta $\Delta T$ to determine the system operational status.

16. A method of determining the service life of a cyclic system comprising the steps of:
    sensing a characteristic of the cyclic system to determine a characteristic value;
    applying the characteristic value to a first algorithm to determine a beginning $T_1$ and an end $T_2$ of a cycle;
    subjecting the characteristic value to a second algorithm calculated over $T_1$ and $T_2$ to determine a diagnostic value K; and
    comparing the diagnostic value to a set of known values to determine a performance status of the system relating to the service life of the cyclic system.

17. The method as defined in claim 16 wherein the characteristic value is a flow rate Q, and said first algorithm is dQ/dt and said second algorithm is $$K = \int_{T1}^{T2} Qdt.$$

18. An apparatus for determining an operational status of a cyclic fluid power system comprising:
    a sensor for sensing a system characteristic wherein the system characteristic is a flow rate;
    a calculating unit operatively connected to the sensor, the calculating unit including circuitry for performing a mathematical integration on the flow rate to determine a diagnostic value and comparing the diagnostic value to a predetermined value to determine the service life status of the system; and
    a notification device operatively connected to the calculating unit for indicating the service life status of the system.

19. The apparatus as defined in claim 18, wherein the calculating unit determines the diagnostic value only based upon the flow rate signal.

20. The apparatus as defined in claim 18, wherein the circuitry of the calculation unit includes a processor for integrating the system characteristic over time.

21. The apparatus as defined in claim 20, wherein the processor is configured to differentiate the system characteristic to determine the values over which the integration of the system characteristic takes place.

22. The apparatus as defined in claim 20, wherein the calculating unit is operatively connected to a control device, said control device generating information on the cycle time and the processor using the cycle time information to perform the integration of the system characteristic.

23. The apparatus as defined in claim 22, wherein the processor compares the calculated diagnostic value to the predetermined value and generates a notification displayed by the notification device.

24. A cyclic fluid power system having an operational status monitor comprising:
- a valve in fluid communication with a fluid source;
- an actuator operatively connected to the valve;
- a sensor for determining a system characteristic wherein the system characteristic is the flow rate;
- a calculating unit operatively connected to the sensor, the calculating unit including circuitry for performing a mathematical integration on the system characteristic to determine a diagnostic value and comparing the diagnostic value to a predetermined value to determine the service life status of the cyclic system, wherein the mathematical integration is $$K = \int_0^T Q\,dt$$

and wherein Q is the flow rate, T is the cycle time and K is the diagnostic value; and
- a notification device operatively connected to the calculating unit for indicating the operational status of the system.

25. The fluid power system as defined in claim 24, wherein the actuator includes a drive component movable from an initial position to an actuated position and back to the initial position, and wherein T equals the time period defined by an actuation of the valve and a return of the actuator to an initial position.

26. The fluid power system as defined in claim 24, wherein the actuator includes a drive component movable from an initial position to an actuated position and wherein T equals the time period from when the drive component moves from the initial position to the actuated position.

27. A method of determining the service life of a cyclic system comprising the steps of:
- determining at least one characteristic of the system to determine a characteristic value;
- determining a cycle time of the system;
- applying the at least one characteristic value to an algorithm in which the characteristic value is integrated to determine a diagnostic value;
- evaluating the diagnostic value over a plurality of system cycles to determine a change in the diagnostic value;
- evaluating the cycle time over a plurality of system cycles to determine a change in the cycle time;
- comparing the change in diagnostic value to the change in the cycle time to determine the operational status of the system.

28. A method of determining the service life of a fluid power cyclic system comprising the steps of:
- determining at least one characteristic of the cyclic system to determine a characteristic value, wherein the characteristic value is a flow rate of the system;
- determining a cycle time of the cyclic system;
- applying the flow rate to an algorithm in which the characteristic value is integrated over the cycle time to determine a diagnostic value;
- evaluating the diagnostic value over a plurality of system cycles to determine a change in the diagnostic value;
- evaluating the cycle time over a plurality of system cycles to determine a change in the cycle time; and
- comparing the change in diagnostic value to the change in the cycle time to determine the operational status of the system.

* * * * *